Aug. 5, 1947. S. BLOOMFIELD ET AL 2,425,228
LOCK NUT
Filed May 14, 1945

INVENTOR.
Samuel Bloomfield
Robert S. Wallach
BY
ATTORNEY

Patented Aug. 5, 1947

2,425,228

UNITED STATES PATENT OFFICE 2,425,228

LOCK NUT

Samuel Bloomfield, Wichita, Kans., and Robert S. Wallach, Madison, N. J.; said Wallach assignor to said Bloomfield Application May 14, 1945, Serial No. 593,642

14 Claims. (Cl. 151—7)

1

This invention pertains to self locking nut assemblies and has for its primary aim to provide nuts for machine bolts or the like, that incorporate as a part of their structure, means for tightly engaging the threads of the bolt and thereby prevent accidental displacement of the nut after it has been moved to the operative position.

One of the most important objects of our invention is to provide a lock nut with means for maintaining the same against accidental removal, which nut is in the nature of the one disclosed in U. S. Letters Patent No. 2,365,380, issued December 19, 1944.

A further and important object of this invention is the provision of a lock nut assembly wherein is included a number of specially formed locking collars and elements for maintaining said collars in place, against distortion and in such condition as to permit removal thereof and therefore, re-use of the nut when the collars have been destroyed due to forcing the lock nut assembly from operative position when disassembling a machine, for example, whereon the nut has been used.

Other aims of this invention are to provide a lock nut of the aforementioned character that has a number of locking collars, held in a unitary condition by a part capable of preventing distortion either radially or axially, as the collars are being forced upon a bolt with the nut of which they form a part.

A still further aim of our invention is the provision of a lock nut wherein is uniquely incorporated a number of specially held locking collars, made of substance capable of being impressed by the threads of the bolt, and having the ability of being removed for replacement when necessary. Such removal of the collar assembly being made possible through the employment of a retaining ring and a perforation, through which perforation, pressure may be applied to overcome the friction serving to hold the collars in place.

Other objects of the invention are to provide an exceptionally rugged lock nut, one that is positive in this action, cheap to manufacture, and capable of re-use as often as desired so far as the main body portion of the nut is concerned.

A lock nut made in accordance with our invention is shown in the accompanying drawing wherein.

2

Figure 1:
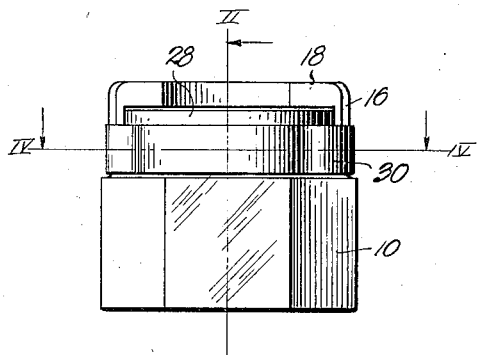
Fig. 1 is a side elevational view of a nut made in accordance with the present invention.
Figure 4:
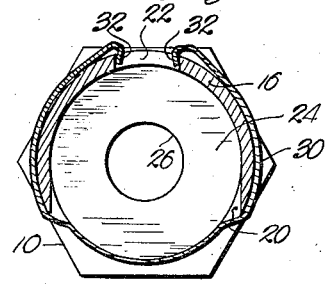

Fig. 4 is a cross sectional view taken on line IV—IV of Fig. 1.

Figure 5:
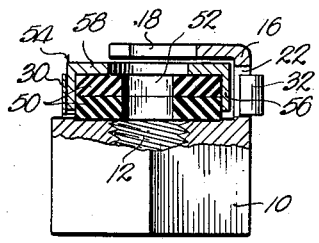

Fig. 5 is a side elevational view in partial section of a lock nut, made to incorporate a modified form of the invention, with respect to the locking collar holder.

Figure 6:
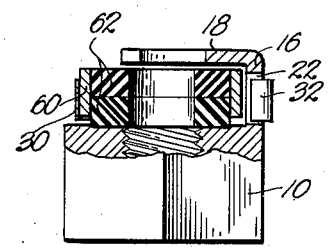

Fig. 6 is a similar view illustrating another form of locking collar holder.

Figure 7:
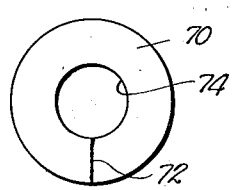

Fig. 7 is a face view of another type of locking collar; and

Figure 8:
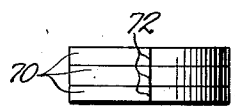

Fig. 8 is an edge elevational view of the collar assembly shown in Fig. 7.

The lock nut illustrated in Figs. 1 to 4 inclusive, embodies that form of the invention capable of fulfilling all of the foregoing objects. In these views the lock nut is illustrated to comprise a body 10 having a threaded opening 12 therethrough, and a cavity 14 to one side of body 10 and in communication with opening 12.

This cavity 14 is formed by extending a skirt 16 axially outward from body 10, upon which skirt is an inturned flanged 18. Both skirt 16 and flange 18 are semi-circular and the ends thereof define an entrance opening 20 through which may be inserted or removed the hereinafter described unitary group of locking collars.

Skirt 16 is perforated as at 22 in opposed relation to entrance opening 20. In other words, perforation 22 is so disposed as to permit the application of force to the locking unit contained in cavity 14 when the removal thereof is desired.

Figure 2:
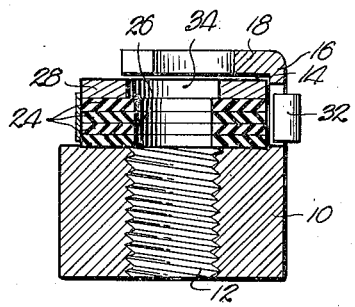
Fig. 2 is a cross sectional view through the same taken on line II—II of Fig. 1.

The several collars 24 are made of material or substance that is relatively soft with respect to the bolt upon which the lock nut is to be placed, and these collars 24 have an opening 26 therethrough, as illustrated in Fig. 2. The collars 24 are in superimposed relation and to avoid their distortion, especially along the portions thereof at the entrance opening 20 to cavity 14, a washer 28 is provided to overlie the collars 24 and to underlie flange 18.

A retaining ring 30 formed as clearly shown in Fig. 4 to bridge the entrance opening 20 and to lie snugly against the exposed peripheries of collars 24 and washer 28, is snapped to place by having its inturned ends 32 brought into engagement with the edge of skirt 16 around perforation 22. Thus, when replacement of collars 24 is desired, this retaining ring is easily and quickly removed whereupon a new set of collars 24 with their overlying washer 28, may be inserted. Slight frictional engagement is established between the peripheries of collars 24 and washer 28, because their outside diameter is slightly greater than the distance between the edges of skirt 16 forming entrance opening 20.

Figure 3:
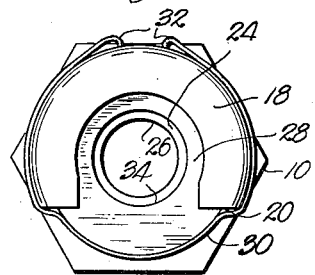
Fig. 3 is a top plan view of the nut.

When the nut constructed as just described and illustrated in Figs. 1 to 4 inclusive, is moved to place on a bolt, it will easily pass through threaded opening 12 and then be forced through collars 24 to establish a tight frictional relation preventing accidental rotation of body 10, due to normal vibration or other forces having a tendency to loosen the bolt when it is in use. The size of the opening 34 in washer 28 is such as to permit free movement of a bolt therethrough that has a diameter capable of traversing opening 12 and since flange 18 is formed as illustrated in Fig. 3, the bolt may pass completely through the lock nut assembly and project to both sides thereof.

As force is being applied to cut threads into collars 24, washer 28 will prevent "lifting" of that portion of collars 24 within entrance opening 20. Retaining ring 30 will hold the collars 24 against displacement relative to each other and against displacement with respect to body 10 of the nut.

The form of lock nut illustrated in Fig. 5 remains the same so far as parts 10, 12, 14, 16, 18, 20, 22, 30 and 32 are concerned. The locking unit in this instance, comprises a plurality of collars 50, each made of a relatively soft substance, such as fiber, with openings 52 therein that are smaller in diameter than the diameter of opening 12.

The holder 54 is angular in transverse cross section and has an annulus 56 as well as a flange 58 to engage the collars 50. This holder will perform the functions above set down with respect to the duties of ring 50 and washer 28 in that it will prevent distortion of collars 50, especially at the entrance opening 20.

The form of the invention illustrated in Fig. 6 is substantially the same as that shown in Fig. 5, but holder 60 is devoid of any overlying flange because the thickness of collars 62 is sufficient to prevent axial displacement at entrance opening 20.

The collars 70 illustrated in Figs. 7 and 8, are of split formation in that each has a radial slit 72 therein to allow the collar to expand and contract as the bolt is forced therethrough. These collars 70 are positioned within cavity 14 in the same manner as above described with respect to collars 24, 50 and 60, but need not be formed of material softer than the bolt because of the split formation thereof. The inner peripheries 74 of these collars will twist to accommodate the contour of the threads on the bolt and thereby establish a tight engagement to prevent accidental loosening.

The advantages of a lock nut made as above described, are far reaching, and the invention contemplates forms other than those illustrated.

Having thus described the invention, what is claimed as new and desired to be secured by Letters Patent is:

1. A lock nut comprising a body having a threaded opening therethrough; an axially projecting skirt on the body partially circumscribing the opening to provide an entrance to the space within the skirt; a collar of relatively soft substance and having an opening therethrough slightly less in diameter than the said threaded opening confined in the said space; and a retaining ring disposed to close the entrance.

2. A lock nut comprising a body having a threaded opening therethrough; an axially projecting skirt on the body partially circumscribing the opening to provide an entrance to the space within the skirt; a collar of relatively soft substance and having an opening therethrough slightly less in diameter than the said threaded opening confined in the said space; a retaining ring disposed to close the entrance; and interengaging elements on the nut and said ring for releasably maintaining the latter in place.

3. A lock nut comprising a body having a threaded opening therethrough; an axially projecting skirt on the body partially circumscribing the opening to provide an entrance to the space within the skirt; a collar of relatively soft substance and having an opening therethrough slightly less in diameter than the said threaded opening confined in the said space; and a retaining ring disposed to close the entrance, said skirt having a perforation therethrough in opposed relation to the entrance to receive a portion of the retaining ring to hold the latter in place.

4. A lock nut comprising a body having a threaded opening therethrough; an axially projecting skirt on the body partially circumscribing the opening to provide an entrance to the space within the skirt; a collar of relatively soft substance and having an opening therethrough slightly less in diameter than the said threaded opening confined in the said space; and a retaining ring disposed to close the entrance, said skirt having a perforation therethrough in opposed relation to the entrance to receive a portion of the retaining ring to hold the latter in place, said entrance being slightly less in width than the outside dimension of the collar whereby to frictionally preclude accidental escape of the collar from the operative position, yet allow removal thereof upon application of force thereto through said perforation.

5. A lock nut assembly comprising a body having a threaded opening therethrough; a cavity formed to one side of the body and having a radial entrance opening; a plurality of collars of relatively soft substance, and having openings therethrough slightly less in diameter than the said threaded opening, confined in said cavity; and structure being assembled with the collars to form a separate unit therewith for limiting relative displacement of the collars while the nut assembly is being forced onto the bolt.

6. A lock nut assembly comprising a body having a threaded opening therethrough; a cavity formed to one side of the body and having a radial entrance opening; a plurality of collars of relatively soft substance, and having openings therethrough slightly less in diameter than the said threaded opening, confined in said cavity; and structure for limiting relative displacement of the collars while the nut assembly is being forced onto a bolt, said structure including a holder circumscribing all the collars.

7. A lock nut assembly comprising a body having a threaded opening therethrough; a cavity formed to one side of the body and having a radial entrance opening; a plurality of collars of relatively soft substance, and having openings therethrough slightly less in diameter than the said threaded opening, confined in said cavity; and structure for limiting relative displacement of the collars while the nut assembly is being forced onto a bolt, said structure including a holder circumscribing all the collars, said holder and its contained collars being movable to and from a place in the cavity through the entrance opening.

8. A lock nut assembly comprising a body having a threaded opening therethrough; a cavity formed to one side of the body and having a radial entrance opening; a plurality of collars of relatively soft substance, and having openings therethrough slightly less in diameter than the said threaded opening, confined in said cavity; structure for limiting relative displacement of the collars while the nut assembly is being forced onto a bolt, said structure including a holder circumscribing all the collars, said holder and its contained collars being movable to and from a place in the cavity through the entrance opening; and a retaining element removably disposed on the body and formed to close the entrance opening and to engage the holder when in the operative position.

9. A lock nut assembly comprising a body having a threaded opening therethrough; a cavity formed to one side of the body and having a radial entrance opening; a plurality of collars of relatively soft substance, and having openings therethrough slightly less in diameter than the said threaded opening, confined in said cavity; and structure for limiting relative displacement of the collars while the nut assembly is being forced onto a bolt, said structure including a holder circumscribing all the collars, said holder and its contained collars being movable to and from a place in the cavity through the entrance opening, said body having a flange in opposed relation to the threaded opening therethrough and adapted to overlie the collars to hold the same against excessive axial movement.

10. A lock nut assembly comprising a body having a threaded opening therethrough; a cavity formed to one side of the body and having a radial entrance opening; a plurality of collars of relatively soft substance, and having openings therethrough slightly less in diameter than the said threaded opening, confined in said cavity; and structure for limiting relative displacement of the collars while the nut assembly is being forced onto a bolt, said structure including a holder circumscribing all the collars, said holder being formed to bridge the entrance opening and lie against the outer peripheries of the collars.

11. A lock nut assembly comprising a body having a threaded opening therethrough; a cavity formed to one side of the body and having a radial entrance opening; a plurality of collars of relatively soft substance, and having openings therethrough slightly less in diameter than the said threaded opening, confined in said cavity; and structure for limiting relative displacement of the collars while the nut assembly is being forced onto a bolt, said structure including a holder circumscribing all the collars, said holder being formed to overlie the face of the outermost collar and to bridge the entrance opening.

12. A lock nut assembly comprising a body having a threaded opening therethrough; a cavity formed to one side of the body and having a radial entrance opening; a plurality of collars of relatively soft substance, and having openings therethrough slightly less in diameter than the said threaded opening, confined in said cavity; and structure for limiting relative displacement of the collars while the nut assembly is being forced onto a bolt, said structure including a holder circumscribing all the collars, said holder being formed to bridge the entrance opening, to lie against the outer peripheries of the collars and to overlie the face of the outermost collar.

13. A lock nut assembly comprising a body having a threaded opening therethrough; a cavity formed to one side of the body and having a radial entrance opening; a plurality of collars of relatively soft substance, and having openings therethrough slightly less in diameter than the said threaded opening, confined in said cavity; and structure for limiting relative displacement of the collars while the nut assembly is being forced onto the bolt, the outermost collar being of relatively hard material and formed to bridge the entrance opening to prevent axial distortion of the remaining collars.

14. A lock nut assembly comprising a body having a threaded opening therethrough; a cavity formed to one side of the body and having a radial entrance opening; a plurality of collars of relatively soft substance, and having openings therethrough slightly less in diameter than the said threaded opening, confined in said cavity; and a retaining ring removably mounted on the body and formed to close the entrance opening, said collars being in superimposed relation and each having a radial slit therein.

SAMUEL BLOOMFIELD.
ROBERT S. WALLACH.

REFERENCES CITED

The following references are of record in the file of this patent:

UNITED STATES PATENTS

| Number | Name | Date |
| --- | --- | --- |
| 2,365,380 | Bloomfield | Dec. 19, 1944 |
| 1,726,628 | Rennerfelt | Sept. 3, 1929 |